United States Patent [19]

Dobbers et al.

[11] Patent Number: 4,931,099
[45] Date of Patent: Jun. 5, 1990

[54] SELF-LEVELLING MORTAR MIXTURE

[75] Inventors: Jürgen Dobbers, Leverkusen; Karl Reizlein, Cologne; Kurt Bredtmann, Leverkusen, all of Fed. Rep. of Germany

[73] Assignee: Bayer Aktiengesellschaft, Leverkusen, Fed. Rep. of Germany

[21] Appl. No.: 237,961

[22] Filed: Aug. 29, 1988

[30] Foreign Application Priority Data

Sep. 8, 1987 [DE] Fed. Rep. of Germany ....... 3730067

[51] Int. Cl.$^5$ ...................... C04B 11/05; C04B 11/06
[52] U.S. Cl. .................................. 106/775; 106/776; 106/784
[58] Field of Search ........................ 106/109, 110, 111

[56] References Cited

U.S. PATENT DOCUMENTS

| 3,900,333 | 8/1975 | Knauf | 106/109 |
| 3,954,492 | 5/1976 | Knauf et al. | 106/109 |
| 4,488,909 | 12/1984 | Galer et al. | 106/89 |

FOREIGN PATENT DOCUMENTS 2609123  9/1977  Fed. Rep. of Germany .

OTHER PUBLICATIONS

Ullmanns Encyklopadie der technischen Chemie 4th Edition, vol. 12, p. 306.
D. R. Karsa, Special Publication No. 59, Symposium University of Salford, 15th–175h Apr. 1986, Royal Society of Chemistry, pp. 32–47.
Ullmanns Encyklopadie der technischen Chemie, 3rd Edition, vol. 8, pp. 117–118.

*Primary Examiner*—Mark L. Bell
*Assistant Examiner*—Anthony J. Green
*Attorney, Agent, or Firm*—Connolly and Hutz

[57] ABSTRACT

A self-levelling mortar mixture containing anhydrite, activator salts, plasticizers, surfactants and water is improved by providing the anhydrite in the form of both coarse-grained particles and finely ground particles.

6 Claims, No Drawings

SELF-LEVELLING MORTAR MIXTURE

This invention relates to a self-levelling mortar mixture containing sythetic anhydrite, activator salts, plasticizers, surfactants and water which may be used for the production of component such as screeds.

BACKGROUND OF THE INVENTION

In the production of screeds, inorganic binders, such as natural or synthetic anhydrite, gypsum or cement, partially unleaned, but generally in conjunction with aggregates (leaning agents), such as sand and gravel, are generally mixed and processed, optionally using additives, such as plasticizers.

German published application 2,657,252 describes a process for the production of a free-flowing composition of anhydrite, an activator, a sulfite- or sulfonic-acid-modified resin based on an amino-s-triazine containing at least two $NH_2$ groups as plasticizer, nonylphenol hexaglycol ether as wetting agent and water. The resin content is from 0.01 to 0.5% by weight and preferably from 0.2 to 0.4% by weight, based on the binder. The water-to-solids ratio shown in Examples 1 to 3 is approximately 0.3 to 0.35. It is also apparent that the anhydrite used is finely ground anhydrite binder. Anhydrite AB 200 according to German Industry Standard ("DIN") 4208 (October 1962 version), new name anhydrite AB 20 according to DIN 4208 (March 1984 version), is used. No leaning agent is used.

The screed produced by this process has a number of disadvantages. As can be seen from "Zement-Kalk-Gips" 17 (1964) 163–466, screeds of finely ground, unleaned anhydrite binder show a tendency towards cracking and warping on account of the excessive shrinkage and swelling.

This tendency to crack can normally be prevented by addition of leaning agents, such as sand, to the mortar mixture. In addition, the high water-to-solids ratio of approximately 0.3 to 0.35 leads to low strength and low setting times.

German 1,297,563 describes the use of anhydrite having a particle size distribution of 0 to 6 mm with at least 30% of the particles smaller than 0.2 mm, sulfate-based activator and water for the construction of face-roadway fills and permanent support piers in mining. The water-to-anhydrite ratio is 0.10 to 0.16 and more especially 0.12 to 0.14. During hardening, the anhydrite increases in volume as, therefore, do the components made from the described anhydrite, which can lead to cracking and warping.

Now, the object of the present invention is to provide an anhydrite-based self-levelling (i.e. the mixture automatically forms a horizontal surface under the effect of gravity, so that no further measures have to be taken before or after hardening of the mxiture to establish a horizontal surface) mortar mixture which does not have any of the disadvantages mentioned above.

BRIEF DESCRIPTION OF THE INVENTION

It has now surprisingly been found that a self-levelling mortar mixture of synthetic, coarse-grained and fine-grained anhydrite and some other additives known per se does not have any of the above-mentioned disadvantages.

DETAILED DESCRIPTION

The present invention relates to a self-levelling mortar mixture containing anhydrite, activator salts, plasticizers, surfactants and water which is characterized in that it contains both synthetic, coarse-grained anhydrite and, at the same time, finely ground anhydrite.

Synthetic coarse-grained anhydrite having a particle size distribution in which approximately 99.5% by weight of the particles are $\leq 8$ mm and approximately 75% by weight of the particles $>0.25$ mm and finely ground anhydrite having a particle size distribution in which at least 80% by weight of the particles are $\leq 0.09$ mm are preferred.

The anhydrite binder AB20 SYN (DIN 4208) in particular is used as the finely ground anhydrite.

The ratio of weight of synthetic, coarse-grained anhydrite to synthetic, finely ground anhydrite is preferably between 1:1 and 6:1 and more especially 4:1.

In addition, the ratio by weight of water to synthetic anhydrite is preferably 0.1 to 0.2 and more preferably 0.12 to 0.16.

The plasticizer may consist of one or more substances known for this purpose and is present in a quantity of 0.05 to 0.5% by weight and preferably in a quantity of 0.1 to 0.2% by weight, based on the total quantity of synthetic anhydrite (Ullmanns Enzylopädie der technischen Chemie 4th Edition, Vol. 12, page 306).

The surfactant consists of one or more substances known for this purpose and is present in a quantity of 0.1 to 3.0% by weight and preferably in a quantity of 0.2 to 1.5% by weight, based on plasticizer (E. Gundermann, Bautenschutz, Chemie und Technologie, Dresden 1967, pages 31 et seq. and D. R. Karsa, Special Publication No. 59, Symposium University of Salford, 15th–17th Apr. 1986, Royal Society of Chemistry, pages 33 to 47).

The activator salt consists of one or more substances known for this purpose in a quantity of 0.7 to 1.3% by weight, based on synthetic anhydrite (Ullmanns Enzyklopädie der technischen Chemie, 3rd Edition, Vol. 8, pages 117–118).

The self-levelling mortar mixture is used inter alia as a fluid screed.

A mixture which has proved to be particularly advantageous is one consisting of 69.6% of weight synthetic anhydrite having a particle size distribution in which approximately 99.5% by weight of the particles are $\leq 8$ mm and approximately 75% by weight of the particles $>0.25$ mm, 17.4% by weight synthetic anhydrite binder AB20 SYN (DIN 4208) with 1% by weight potassium sulfate as activator, 0.13% by weight plasticizer, 0.0017% by weight surfactant and approximately 13% by weight water.

It must be regarded as extremely surprising that the replacement of part of the finely ground anhydrite hitherto used by synthetic coarse-grained anhydrite, coupled with a much lower water-to-anhydrite ratio, should lead to a self-levelling mortar mixture which is eminently suitable for the production of a fluid screed and which is distinguished by so little shrinkage and swelling that no cracks are formed during hardening. A self-levelling mortar mixture distinguished by high ultimate strength and a short setting time is obtained even with a water-to-anhydrite ratio by weight of only 0.12 to 0.15.

To prepare the mortar mixture, synthetic, finely ground anhydrite containing an activator salt, such as for example sodium sulfate or zinc sulfate (for example anhydrite binder AB20 SYN, see DIN 4208) is mixed with synthetic, coarse-grained anhydrite in a ratio by weight of preferably 1:4 in a mixer, for example a positive mixer with a pump for pumping the screed. After addition of plasticizer, such as for example sulfonated melamine-formaldehyde condensate, sulfonated ditolyl ether-formaldehyde condensate, sulfonated naphthalene-formaldehyde condensate, sulfonated and alkylated phenol-formaldehyde condensate or lignin sulfonate, surfactant, such as an anionic or nonionic surfactant, and 12 to 16% by weight water, based on anhydrite, a pumpable and self-levelling mortar mixture is obtained. The plasticizer and the surfactant may be added in the form of an aqueous solution or in solid form.

The order in which the individual components appear in this list is not necessarily the order in which they are added during the mixing process.

The mixture may be prepared in individual parts or continuously. Normally, all the components apart from water are initially mixed, the mortar mixture only being obtained on site by an appropriate addition of water.

The following Examples are intended to illustrate the self-levelling mortar mixture according to the invention without limiting it in any way.

EXAMPLE 1

Synthetic, finely ground anhydrite AB20 SYN (DIN 4208) containing 1% potassium sulfate, based on anhydrite, as activator and synthetic anhydrite having the following particle size distribution:

| | |
|---|---|
| <0.25 mm | 22.09% by weight |
| 0.25–0.5 mm | 12.43% by weight |
| 0.5–1.0 mm | 21.52% by weight |
| 1.0–2.0 mm | 22.55% by weight |
| 2.0–3.0 mm | 9.43% by weight |
| 3.0–4.0 mm | 4.64% by weight |
| 4.0–6.0 mm | 6.47% by weight |
| 6.0–8.0 mm | 0.50% by weight |
| ≧8.0 mm | 0.37% by weight | are mixed in a ratio by weight of 1:4 to 1:5.5. Self-levelling mortar mixtures of which the strengths are shown in the following Table are obtained with 0.16% by weight, based on the anhydrite, of a mixture of 98.7% by weight of a sulfonated melamine-formaldehyde condensate and 1.3% by weight of a fatty alcohol ether sulfate ($C_{12}H_{25}O(CH_2CH_2O)_3SO_3NH_4$) and a quantity of water corresponding to the water-to-anhydrite ratio shown in the following Table.

TABLE

| | | BS [N/mm$^2$] | | | C [N/mm$^2$] | | |
|---|---|---|---|---|---|---|---|
| MR | WR | 3 d | 6 d | 28 d | 3 d | 6 d | 28 d |
| 1:4.0 | 0.142 | 4.04 | 6.05 | 7.48 | 18.78 | 28.42 | 37.82 |
| 1:4.5 | 0.125 | 3.18 | 4.78 | 5.89 | 13.71 | 17.60 | 23.71 |
| 1:5.0 | 0.125 | 3.15 | 4.41 | 5.74 | 12.15 | 18.10 | 24.03 |
| 1:5.5 | 0.128 | 3.14 | 4.56 | 5.86 | 12.16 | 19.13 | 23.45 |

MR = ratio by weight of anhydrite AB20 SYN to synthetic, coarse-grained anhydrite having the particle size distribution indicated above [DIN 4208: AB20 SYN - synthetic anhydrite binder of strength class AB20]
WR = water-to-anhydrite ratio by weight
BS = bending tension strength according to DIN 4208
C = compressive strength according to DIN 4208
d = days

EXAMPLE 2

Synthetic, finely ground anhydrite AB20 SYN (DIN 4208) containing 1% by weight potassium sulfate, based on anhydrite, as activator and synthetic anhydrite having the particle size distribution shown in Example 1 are mixed in a ratio by weight of 1:4 and the resulting mixture mixed with 0.24% by weight of a sulfonated ditolyl ether-formaldehyde condensate, 0.04% by weight of a sulfo methylated phenol-formaldehyde condensate, 0.032% by weight tributyl phosphate and 0.008% by weight polyether polyol (for example ®Desmophen 3400, a product of Bayer AG), based on the finely ground anhydrite. The addition of 19.2% by weight water, based on the total anhydrite, gives a mortar mixture with which mortar prisms measuring 40 mm × 40 mm × 160 mm are prepared in accordance with DIN 1164, Part 7, November 1978 Edition. The test specimens thus obtained are stored at 20° C./65% relative air humidity. After 60 days, their average shrinkage is 0.01 mm/m and, after 100 days, 0.015 mm/m.

EXAMPLE 3

Synthetic, finely ground anhydrite AB20 SYN (DIN 4208) containing 1% by weight potassium sulfate, based on anhydrite, as activator and synthetic anhydrite having the particle size distribution shown in Example 1 are mixed in a ratio by weight of 1:4 and the resulting mixture mixed with 0.16% by weight of a sulfonated melamine-formaldehyde condensate and 0.0008% by weight of a fatty alcohol ether sulfate ($C_{12}H_{25}O(CH_2CH_2O)_2SO_3Na$), based on the finely ground anhydrite. The addition of 18.4% by weight water, based on the total anhydrite, gives a mortar mixture which is tested for shrinkage and swelling in the same way as in Example 2. After 60 days, the average shrinkage is 0.03 mm/m and, after 100 days, 0.04 mm/m.

COMPARISON EXAMPLE 1

Synthetic, finely ground anhydrite AB20 SYN (DIN 4208) containing 1% by weight potassium sulfate, based on anhydrite, as activator is mixed with 0.30% by weight of a sulfonated ditolyl ether-formaldehyde condensate, 0.05% by weight of a sulfomethylated and ethoxylated phenol-formaldehyde condensate, 0.04% by weight tributyl phosphate and 0.01% by weight polyether polyol (for example ®Desmophen 3400, a product of Bayer AG).

The addition of 25% by weight water, based on the anhydrite, gives a mortar mixture which is tested for shrinkage and swelling in the same way as described in Example 2. After 60 days, the average shrinkage is 0.13 mm/m and, after 100 days, 0.18 mm/m.

COMPARISON EXAMPLE 2

Synthetic, finely ground anhydrite AB20 SYN (DIN 4208) containing 1% by weight potassium sulfate, based on anhydrite, as activator is mixed with 0.2% of a sulfonated melamine-formaldehyde condensate and 0.001% of a fatty alcohol ether sulfate ($C_{12}H_{25}O(CH_2CH_2O)_2SO_3Na$).

The addition of 24% by weight water, based on the anhydrite, gives a mortar mixture which is tested for shrinkage and swelling in the same way as described in Example 2. After 60 days, its average shrinkage is 0.17 mm/m and, after 100 days, 0.18 mm/m.

COMPARISON EXAMPLE 3

Synthetic, finely ground anhydrite AB20 SYN (DIN 4208) containing 1% by weight potassium sulfate, based on anhydrite, is mixed with 0-8 mm site sand in a ratio by weight of 1:2 and the resulting mixture mixed with
0.30% by weight of a sulfonated ditolyl ether-formaldehyde condensate,
0.05% by weight of a sulfomethylated and ethoxylated phenol-formaldehyde condensate,
0.04% by weight tributyl phosphate and
0.01% by weight polyether polyol (®Desmophen 3400, a product of Bayer AG),
based on the anhydrite. The addition of 41.5% water, based on the anhydrite, gives a mortar mixture which is tested for shrinkage and swelling in the same way as described in Example 2. After 60 days, its average shrinkage is 0.01 mm/m and, after 100 days, 0.01 mm/m.

COMPARISON EXAMPLE 4

Synthetic, finely ground anhydrite AB20 SYN (DIN 4208) containing 1% by weight potassium sulfate, based on anhydrite, is mixed with 0-8 mm site sand in a ratio by weight of 1:2 and the resulting mixture mixed with 0.2% of a sulfonated melamine-formaldehyde condensate and 0.001% of a fatty alcohol ether sulfate ($C_{12}H_{25}O(CH_2CH_2O)_2-SO_3Na$),
based on anhydrite. The addition of 39.0% by weight water, based on the anhydrite, gives a mortar mixture which is tested for shrinkage and swelling in the same way as described in Example 2. After 60 days, its average shrinkage is 0.05 mm/m and, after 100 days, 0.06 mm/m.

What is claimed is:

1. In an improved self-levelling mortar mixture containing synthetic anhydrite, activator salts, plasticizers, surfactants and water
    the improvement comprises said anhydrite containing both coarse-grained anhydrite and finely ground anhydrite wherein the ratio by weight of coarse-grained synthetic anhydrite to finely ground synthetic anhydrite is 1:1 to 6:1 and wherein at least 80% by weight of the particles of the finely ground anhydrite have a size of 0.09 mm or less.

2. A mortar mixture as claimed in claim 1 wherein the coarse-grained synthetic anhydrite is a synthetic anhydrite having a particle size distribution in which approximately 99.5% by weight of the particles have a size of 8 mm or less and approximately 75% by weight of the particles have a size greater than 0.25 mm.

3. A mortar mixture as claimed in claim 1 wherein the ratio by weight of coarse-grained synthetic anhydrite to finely ground synthetic anhydrite is about 4:1.

4. A mortar mixture as claimed in claim 1 wherein the ratio of water to synthetic anhydrite is 0.1 to 0.2.

5. A mortar mixture as claimed in claim 4 wherein the ratio of water to synthetic anhydrite is about 0.12 to 0.19.

6. Fluid screeds containing the self-levelling mortar mixture according to claim 1.

* * * * *